（12）United States Patent
Van Benthem

(10) Patent No.: US 11,836,845 B2
(45) Date of Patent: *Dec. 5, 2023

(54) TEXTURE FILTERING WITH DYNAMIC SCHEDULING IN COMPUTER GRAPHICS

(71) Applicant: Imagination Technologies Limited, Kings Langley (GB)

(72) Inventor: Casper Van Benthem, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 60 days.

This patent is subject to a terminal disclaimer.

(21) Appl. No.: 17/538,933

(22) Filed: Nov. 30, 2021

(65) Prior Publication Data
US 2022/0084276 A1  Mar. 17, 2022

Related U.S. Application Data

(63) Continuation of application No. 16/800,242, filed on Feb. 25, 2020, now Pat. No. 11,200,723, which is a continuation of application No. 16/370,493, filed on Mar. 29, 2019, now Pat. No. 10,614,610.

(30) Foreign Application Priority Data

Apr. 5, 2018 (GB) ...................................... 1805637

(51) Int. Cl.
| | | |
|---|---|---|
| *G06T 15/04* | (2011.01) |
| *G06F 9/38* | (2018.01) |
| *G06T 1/20* | (2006.01) |
| *G06T 15/00* | (2011.01) |
| *G06T 17/10* | (2006.01) |
| *G06T 17/20* | (2006.01) |

(52) U.S. Cl.
CPC ............ *G06T 15/04* (2013.01); *G06F 9/3877* (2013.01); *G06F 9/3885* (2013.01); *G06T 1/20* (2013.01); *G06T 15/005* (2013.01); *G06T 17/10* (2013.01); *G06T 17/20* (2013.01)

(58) Field of Classification Search
CPC ....... G06F 9/3877; G06F 9/3885; G06T 1/20; G06T 15/005; G06T 15/04; G06T 17/10; G06T 17/20

See application file for complete search history.

(56) References Cited

U.S. PATENT DOCUMENTS

| | | |
|---|---|---|
| 8,190,669 B1 | 5/2012 | Oberman et al. |
| 2005/0110792 A1 | 5/2005 | Morein et al. |
| 2007/0136508 A1 | 6/2007 | Rieke et al. |
| 2009/0160870 A1 | 6/2009 | Wang et al. |
| 2015/0130818 A1 | 5/2015 | Peng et al. |
| 2018/0095785 A1 | 4/2018 | Koker et al. |

*Primary Examiner* — Sing-Wai Wu
(74) *Attorney, Agent, or Firm* — Potomac Law Group, PLLC; Vincent M DeLuca

(57) ABSTRACT

A texture filtering unit includes a datapath block and a control block. The datapath block includes one or more parallel computation pipelines, each containing at least one hardware logic component configured to receive a plurality of inputs and generate an output value as part of a texture filtering operation. The control block includes a plurality of sequencers and an arbiter. Each sequencer executes a microprogram that defines a sequence of operations to be performed by the one or more pipelines in the datapath block as part of a texture filtering operation and the arbiter controls access, by the sequencers, to the one or more pipelines in the datapath based on predefined prioritization rules.

20 Claims, 9 Drawing Sheets

TEXTURE FILTERING WITH DYNAMIC SCHEDULING IN COMPUTER GRAPHICS

CROSS-REFERENCE TO RELATED APPLICATIONS AND CLAIM OF PRIORITY

This application is a continuation under 35 U.S.C. 120 of copending application Ser. No. 16/800,242 filed Feb. 25, 2020, now U.S. Pat. No. 11,200,723, which is a continuation of prior application Ser. No. 16/370,493 filed Mar. 29, 2019, now U.S. Pat. No. 10,614,610, which claims foreign priority under 35 U.S.C. 119 from United Kingdom Application No. 1805637.4 filed Apr. 5, 2018.

BACKGROUND

In 3D computer graphics, much of the information contained within a scene is encoded as surface properties of 3D geometry. Texture mapping, which is an efficient technique for encoding this information as bitmaps, is therefore an integral part of the process of rendering an image. Reading directly from textures usually does not provide satisfactory image quality as the projection of 3D geometry often requires some form of resampling and as a result, as part of rendering a scene, a graphics processing unit (GPU) performs texture filtering. This may, for example, be because the pixel centres (in the rendered scene) do not align with the texel centres in the texture (where a texture comprises an array of texels, such that texels in a texture are analogous to the pixels in an image) and in different situations, pixels can be larger or smaller than texels.

There are many different methods for texture filtering, including volumetric, anisotropic and trilinear filtering and in various examples, these methods may be applied in various combinations. Filtering can be a computationally expensive operation and the hardware required to implement it can be large.

The embodiments described below are provided by way of example only and are not limiting of implementations which solve any or all of the disadvantages of known methods of implementing texture filtering in hardware.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A texture filtering unit is described that comprises a datapath block and a control block. The datapath block comprises one or more computation pipeline (and in various examples, a plurality of parallel computation pipelines), each containing at least one hardware logic component configured to receive a plurality of inputs and generate an output value as part of a texture filtering operation. The control block comprises a plurality of sequencers and an arbiter. Each sequencer executes a micro-program that defines a sequence of operations to be performed by the one or more pipelines in the datapath block as part of a texture filtering operation and the arbiter controls access, by the sequencers, to the one or more pipelines in the datapath based on predefined prioritization rules.

A first aspect provides a graphics processing unit comprising a texture filtering unit implemented in hardware logic, the texture filtering unit comprising: a plurality of inputs arranged to receive one or more texture values and a plurality of filter coefficients, the plurality of filter coefficients comprising coefficients relating to a plurality of different texture filtering methods; a datapath block comprising one or more computation pipelines, each containing at least one hardware logic component configured to receive a plurality of inputs and generate an output value as part of a texture filtering operation; and a control block comprising a plurality of sequencers and an arbiter, wherein each sequencer comprises a plurality of hard-coded micro-programs and hardware logic arranged to select one of the micro-programs based on one or more control inputs, wherein each micro-program defines a sequence of operations to be performed by the pipelines in the datapath block as part of a texture filtering operation and different micro-programs implement different combinations of texture filtering methods, and wherein the arbiter comprises hardware logic arranged to control access to the computation pipelines by the sequencers according to prioritization rules.

A second aspect provides a method of texture filtering within a GPU, the GPU comprising a texture filtering unit and the texture filtering unit comprising a datapath block comprising one or more computation pipelines and a control block comprising a plurality of sequencers and an arbiter, the method comprising: selecting, in each sequencer, a micro-program based on one or more control inputs, wherein the micro-program defines a sequence of operations to be performed by the pipelines in the datapath block as part of a texture filtering operation and different micro-programs implement different combinations of texture filtering methods; executing, in each sequencer, the selected micro-program and sending a sequence of requests for access to one of the pipelines in the datapath block to the arbiter, each request corresponding to an operation in the sequence defined by the selected micro-program; and allocating, in the arbiter, the pipelines in the datapath block to one of the sequencers based on the requests received and prioritization rules.

The texture filtering unit described herein may be embodied in hardware on an integrated circuit. There may be provided a method of manufacturing, at an integrated circuit manufacturing system, a texture filtering unit. There may be provided an integrated circuit definition dataset that, when processed in an integrated circuit manufacturing system, configures the system to manufacture a texture filtering unit. There may be provided a non-transitory computer readable storage medium having stored thereon a computer readable description of an integrated circuit that, when processed, causes a layout processing system to generate a circuit layout description used in an integrated circuit manufacturing system to manufacture a texture filtering unit.

There may be provided an integrated circuit manufacturing system comprising: a non-transitory computer readable storage medium having stored thereon a computer readable integrated circuit description that describes the texture filtering unit; a layout processing system configured to process the integrated circuit description so as to generate a circuit layout description of an integrated circuit embodying the texture filtering unit; and an integrated circuit generation system configured to manufacture the texture filtering unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
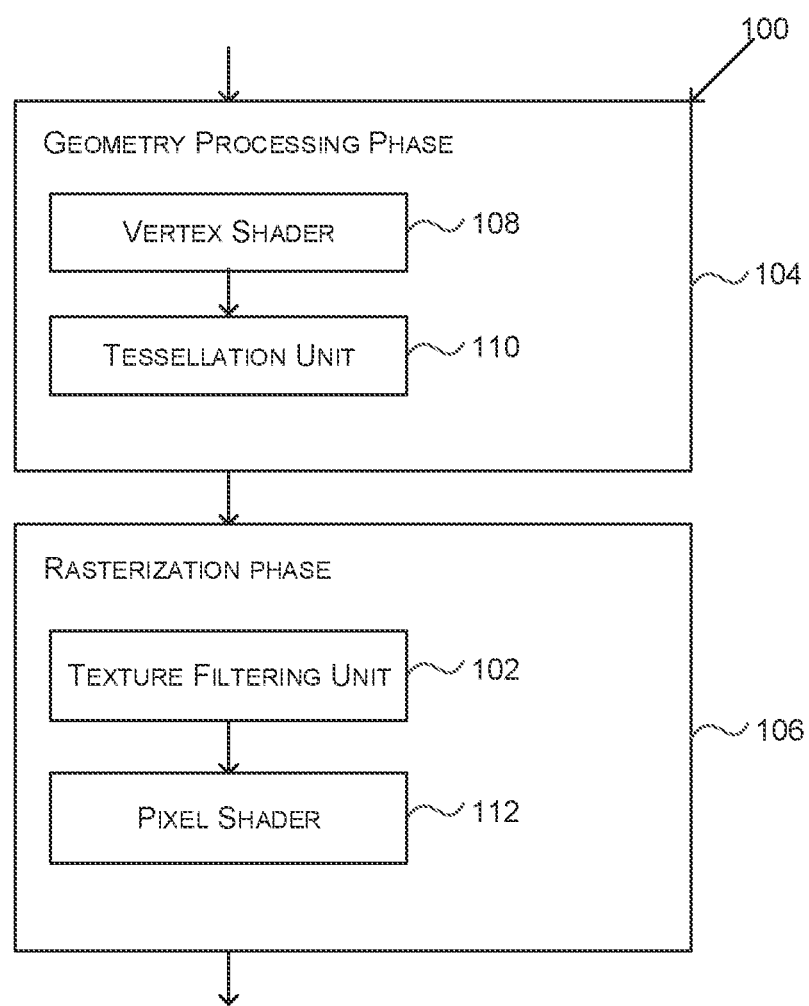
FIG. 1 is a schematic diagram of an example graphics processing unit (GPU) pipeline.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Texture filtering is implemented in dedicated hardware within a GPU and as described above it is a computationally expensive operation and so this hardware can be quite large. In order to increase the throughput of the hardware, it is important that the hardware is used efficiently; however, scheduling the different parts of a filtering operation can be very complex and as a result, in known systems, the scheduling is done by hand.

Described herein is a texture filtering unit that comprises a datapath portion and a control portion and which may be implemented within a GPU. In various examples, the datapath portion comprises a plurality of independent computation pipelines that each receive a plurality of inputs and generate an output value as part of a texture filtering operation. In other examples, the datapath portion may comprise a single computation pipeline. The control portion controls access to the computation pipelines and performs dynamic scheduling using a plurality of non-programmable sequencers and an arbiter. The control portion may additionally hand the protocol of transactions of data into and out of the texture filtering unit.

Each filtering operation typically involves multiple computations and as a consequence requires multiple uses of the same pipeline and/or use of multiple pipelines. Therefore the output that is generated by a computation pipeline may be an intermediate value that requires further processing (by one of the computation pipelines) or may be the final output of a texture filtering operation. Each texture value that is input to the texture filtering unit (and is an input to the texture filtering operation) only contributes to a single output (i.e. a single filtered value); however, multiple inputs typically contribute to each output and depending upon whether interleaving is used these inputs may not necessarily be received immediately following each other.

Each of the sequencers operates in one of a set of pre-defined and hard-coded operating modes, where the particular mode used at any time is selected dependent upon one or more control inputs. Each of the hard-coded operation modes relates to a different combination of filtering methods and defines a sequence of operations to be performed on a set of input data to generate the final output of the texture filtering operation. The arbiter controls which sequencer has access to each of the computation pipelines at any time based on pre-defined rules. This can result in individual sequencers being stalled but the computation pipelines are not stalled. This increases the efficiency of the hardware and increases the throughput without requiring additional pipelines in the datapath (e.g. without requiring dedicated pipelines for each operating mode or for each sequencer). The throughput benefit may be particularly noticeable when switching between operating modes, because hand-optimising the transition between sequences in known systems is impractical. The use of sequencers and an arbiter in this way also provides the ability to handle interleaved signals (e.g. for each of the colour changes of an image) and is flexible (e.g. because the utilisation is not reduced significantly if 3 instead of 4 of the colour changes are computed). The ability to support both serial and interleaved modes also reduces the need for FIFOs to multiplex or serialise inputs externally to the texture filtering unit.

FIG. 1 shows a schematic diagram of an example graphics processing unit (GPU) pipeline 100 which may be implemented in hardware within a GPU and which comprises a texture filtering unit 102. As shown in FIG. 1, the pipeline 100 comprises a geometry processing phase 104 and a rasterization phase 106. Data generated by the geometry processing phase 104 may pass directly to the rasterization phase 106 and/or some of the data may be written to memory (e.g. parameter memory, not shown in FIG. 1) by the geometry processing phase 104 and then read from memory by the rasterization phase 106.

The geometry processing phase 104 comprises a vertex shader 108 and tessellation unit 110. It may, in various examples, also comprise a tiling unit (not shown in FIG. 1). Between the vertex shader 108 and the tessellation unit (or tessellator) 110 there may be one or more optional hull shaders (not shown in FIG. 1). The geometry processing phase 104 may also comprise other elements not shown in FIG. 1, such as a memory and/or other elements.

The vertex shader 108 is responsible for performing per-vertex calculations. Unlike the vertex shader, the hardware tessellation unit 110 (and any optional hull shaders) operates per-patch and not per-vertex. The tessellation unit 110 outputs primitives.

The rasterization phase 106 renders some or all of the primitives generated by the geometry processing phase 104. The rasterization phase 106 comprises the texture filtering unit 102, a pixel shader 112 and may comprise other elements not shown in FIG. 1. The structure and operation of the texture filtering unit 102 is described in detail below.

Figure 2:
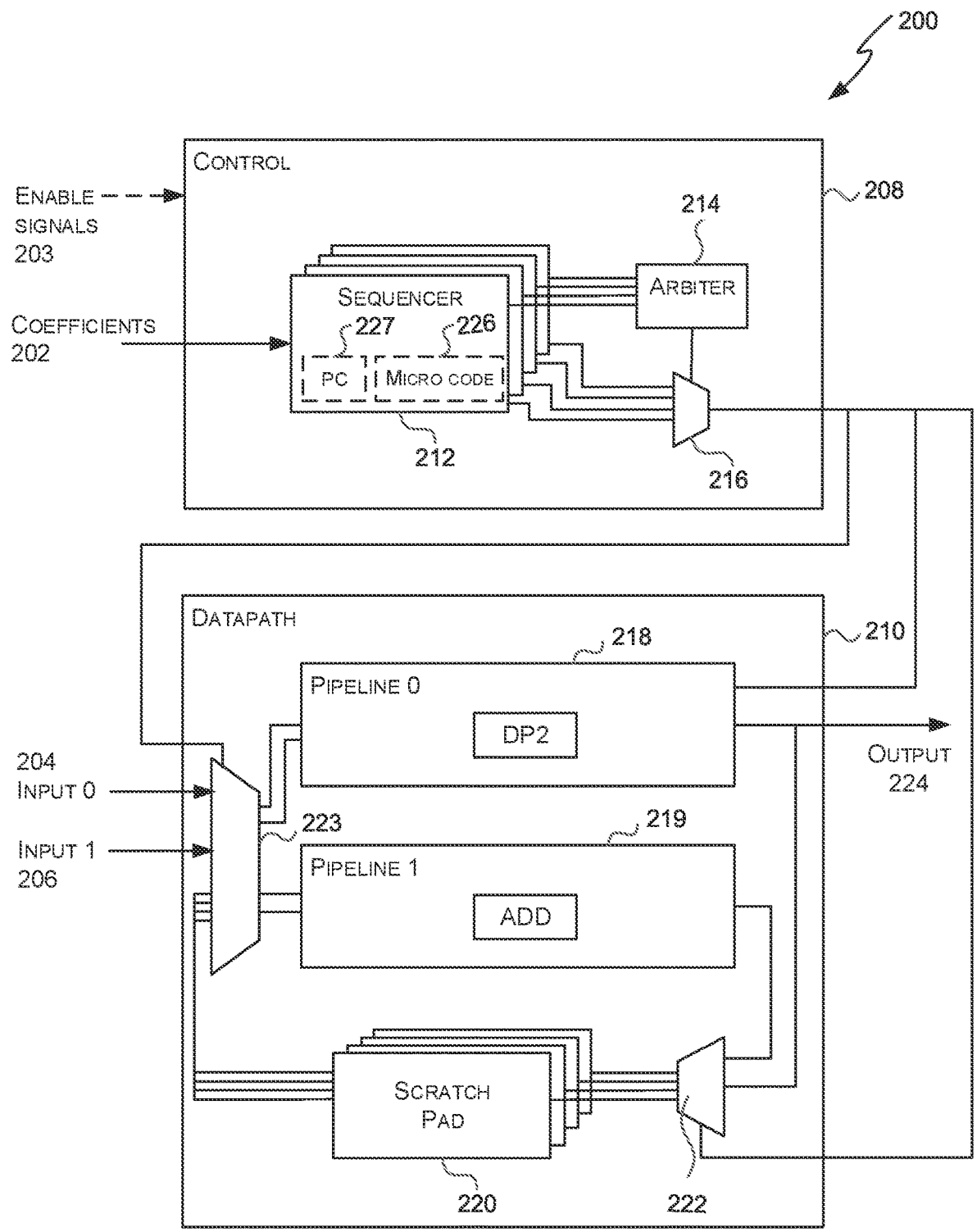
FIG. 2 is a schematic diagram of a first example texture filtering unit.

FIG. 2 is a schematic diagram of a first example texture filtering unit 200 which may be implemented as the texture filtering unit 102 in the pipeline 100 of FIG. 1. As shown in FIG. 2, the texture filtering unit 200 comprises several inputs, including a plurality of filter coefficients 202 and two texture value inputs: input0 204 and input1 206. It is these texture values 204, 206 that are the input data that is filtered in the filtering operation performed by the texture filtering unit and the exact filtering operation that is performed is specified, at least in part, by the filter coefficients 202. In various examples, the texture filtering unit 200 may receive one texture values per clock cycle (via either input0 or input1); however, in other examples, a texture filtering unit may be configured to receive two or more texture values per clock cycle (e.g. four texture values per clock cycle) and where more than two texture values are input in a single clock cycle, the texture filtering unit 200 may comprise additional inputs for this purpose (not shown in FIG. 2). The texture values that are received (which may, for example, be the result of bilinear filtering) are usually floating-point values (e.g. full precision binary floating-point format which may be referred to as F32); however the hardware and methods described herein may be used with texture values of any format (e.g. half precision binary floating-point format, F16, or integer format).

The texture filtering unit 200 further comprises a control block 208 and a datapath block 210. The control block 208 comprises a plurality of sequencers 212, an arbiter 214 and a multiplexer 216. In various examples, the datapath block 210 may comprise four identical sequencers 212 as shown in FIG. 2. In other examples, there may be a different number of sequencers. The datapath block 210 comprises a plurality of parallel, independent pipelines 218-219 and a set of scratchpad registers 220 for each sequencer 212 (e.g. four sets of scratchpad registers, one per sequencer, in the example shown in FIG. 2). In various examples, each set of scratchpad registers 220 may comprise 5 or 6 registers. In other examples there may be a different number of registers in each set of scratchpad registers 220 and in some examples, the scratchpad registers 220 may be replaced by alternative memory structures that are configured to have similar functionality (e.g. FIFOs or other memories).

The datapath block 210 also comprises one or more multiplexers 222-223 that control where intermediate values are stored, i.e. one multiplexer 222 (which may be referred to as the store multiplexer) controls where an intermediate value is stored (i.e. in which set of scratchpad registers 220 it is stored) and a second multiplexer 223 (which may be referred to as the source multiplexer) controls what values (whether input values or intermediate values) are input to each of the pipelines 218-219. In other examples, the multiplexers 222-223 may be replaced by alternative logic that performs a similar switching and/or selection function. The operation of these multiplexers 222-223 is controlled by the control block 208 in the example shown in FIG. 2, e.g. as shown by the control lines shown in FIG. 2 from the arbiter to the multiplexers 222-223 and pipeline 218. In various examples as the arbiter 214 picks a sequencer instruction to execute and the store destination of that instruction is sent through the pipeline in parallel with the calculation, which then controls the multiplexing and write-enable of the scratchpad registers. In other examples, however the control of the multiplexers 222-223 may be implemented as a separate pipeline, a FIFO, or other state machine.

Figure 4:
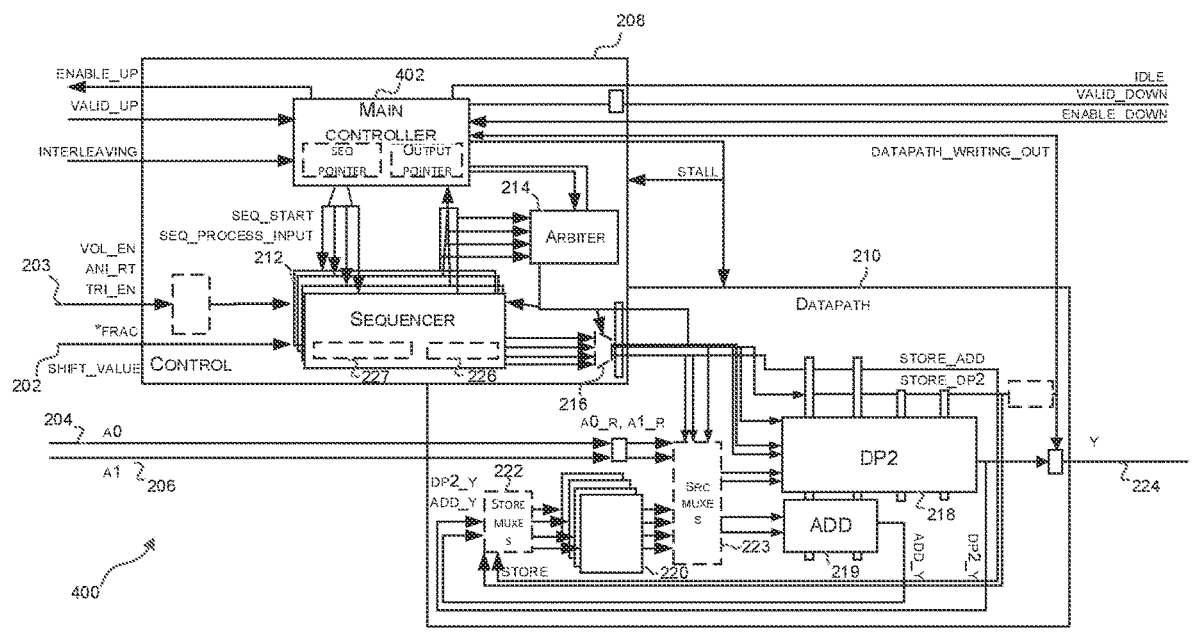
FIG. 4 is a schematic diagram of a second example texture filtering unit.

Whilst FIG. 2 shows various signal lines, each signal line may represent multiple signals and there may be additional signals not shown in FIG. 2 and further examples are shown in FIG. 4.

The texture filtering unit 200 takes a plurality of texture values as input (via inputs 204, 206) and generates a single filtered output (which is output via output 224) in the datapath block 210 under the control of the control block 208. The filtering is implemented by computational logic blocks within the pipelines 218-219 and these computational logic blocks may, for example, be addition units, multipliers, two-dimensional dot product units (DP2s, which given four inputs, a,b,c,d output ac+bd and also allow (c−1)*a+c*b to be calculated efficiently), three-input additions, fused multiply-adds (FMA) etc. In the example shown in FIG. 2, the first pipeline, pipeline0 218, comprises a single DP2 and the second pipeline, pipeline1 219, comprises a single addition unit. In other examples, the pipelines may comprise additional and/or different computational logic blocks (e.g. the first pipeline 218 may comprise a multiplier instead of a DP2 or either pipeline may comprise a second or further computational logic block). A single texture filtering operation may require several passes through one or both of the pipelines 218-219 (as described in more detail below) and intermediate results (i.e. results output by a pipeline which are not a final filtered output value) are stored in the scratchpad registers 220 for the corresponding sequencer (i.e. the sequencer that was controlling the pipeline when the intermediate result was generated). These intermediate results can then be input, from the scratchpad registers 220 to one of the pipelines 218-219, as an input to a subsequent pass through a pipeline. In various examples a final filtered output value may also be stored in the scratchpad registers 220 (e.g. where it cannot be sent to the output yet, but the texture filtering unit wants to continue more computations without delay). Such stored final filtered output values are then passed back through a pipeline when they can be output but bypass the computational logic blocks (e.g. the DP2). This ability to store a final filtered output value significantly improves performance when alternating between simple and complex filtering functions (e.g. between aniso-2 and aniso-16).

In various examples the texture filtering unit 200 is arranged to perform any combination of volumetric, anisotropic and trilinear filtering using the pipelines 218-219; however, in other examples, the texture filtering unit 200 is arranged to perform any combination of a different set of two or more filtering methods and may perform any kind of linear filtering and in various examples also bilinear filtering. The coefficients 202 that are input to the texture filtering unit 200 therefore comprise at least one coefficient for each filtering method that the texture filtering unit 200 can implement, e.g. vfrac, afrac and tfrac (referred to collectively as *frac), where vfrac is the coefficient for volumetric filtering, afrac is the coefficient for anisotropic filtering and tfrac is the coefficient for trilinear filtering. In various examples, the values of the coefficients may change every clock cycle or may change less frequently or may be constant (e.g. vfrac may change each clock cycle, afrac may change less often and tfrac may be constant). In scenarios where only a proper subset of the filtering methods are used, the coefficients of those methods not being used may be set to a default value (e.g. where anisotropic filtering is not used the coefficient, afrac, may be set to one) or separate enable signals 203 may additionally be provided.

In examples where enable signals 203 are provided these may have a value that specifies whether each filtering method (or mode) is enabled and any necessary parameters for the filtering method (e.g. the anisotropic filtering mode). For example, three enable signals may be provided as detailed below, although certain combinations (e.g. {0,0,0}) may not be permitted or may have special meaning (e.g. resulting in bypassing inputs to the output):

| Enable signal | Possible values | Meaning |
| --- | --- | --- |
| vol_en | 0, 1 | Volumetric filtering is disabled or enabled respectively |
| tri_en | 0, 1 | Trilinear filtering is disabled or enabled respectively |
| ani_rt | 0, 1, 3, 5, 7, 9, 11, 13, 15 | Anisotropic filtering is disabled (ani_rt = 0) or enabled (ani_rt > 0), where, if anisotropic filtering is enabled, the number of texture values combined is given by one more than the value of the enable signal (i.e. ani_rt + 1). |

The texture filtering unit 200 is arranged to perform filtering using any combination of one or more of a set of filtering methods and as described above, this may involve computations using multiple input texture values and multiple passes through one or both of the pipelines 218-219 (with each pass through a pipeline using different input values, where the input values may be input texture values or intermediate values calculated in a previous pass through one of the pipelines). Examples of the texture filtering operations are shown in FIGS. 3A-C.

Figure 3A:
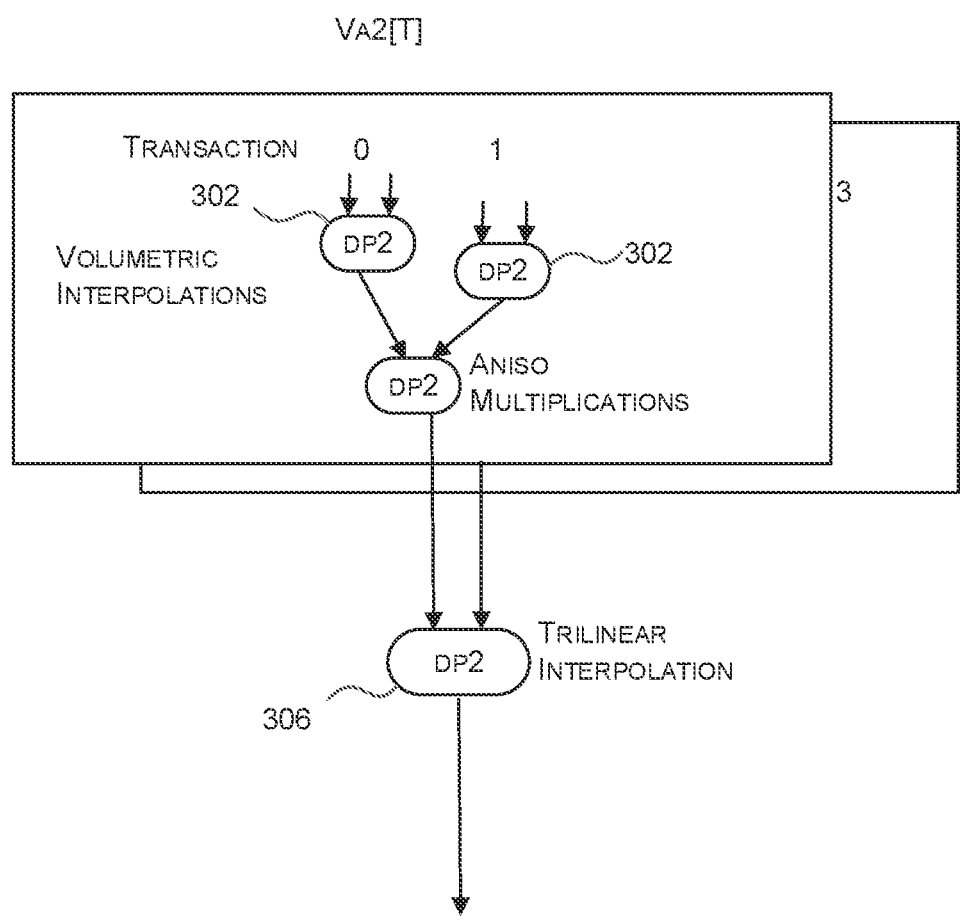
FIGS. 3A, 3B and 3C show graphic representations of three different texture filtering operations that may be implemented by a texture filtering unit as described herein.

FIG. 3A shows a graphical representation of the operations performed when the texture filtering combines volumetric filtering and anisotropic-2 (e.g. where vol_en=1 and ani_rt=1). In this example, volumetric interpolations are performed first by two successive operations using the first pipeline 218 that comprises a DP2 (blocks 302, i.e. two passes through the first pipeline 218) and then the DP2 is used again for the anisotropic multiplications and final addition (block 304, i.e. a third pass through the first pipeline 218). If trilinear filtering is also used (e.g. where vol_en=1, tri_en=1 and ani_rt=1) then the DP2 may be used again for the trilinear interpolation (block 306, i.e. a fourth pass through the first pipeline 218). The total number of inputs is given by Number of texture values = $(vol\_en + 1) * (ani\_rt + 1) * (tri\_en + 1)$ and hence if only volumetric filtering and anisotropic-2 filtering are used, there are only 4 inputs (2*2*1=4) whereas if trilinear filtering is also used, there are 8 inputs (2*2*2=8). In this example it can be seen that the second pipeline 219 is not used at all. Where there are two inputs per input transaction, the number of transactions is given by the number of inputs divided by two and the numbers at the top of the operation order diagrams shown in FIGS. 3A-C refer to these transactions, rather than inputs.

Figure 3B:
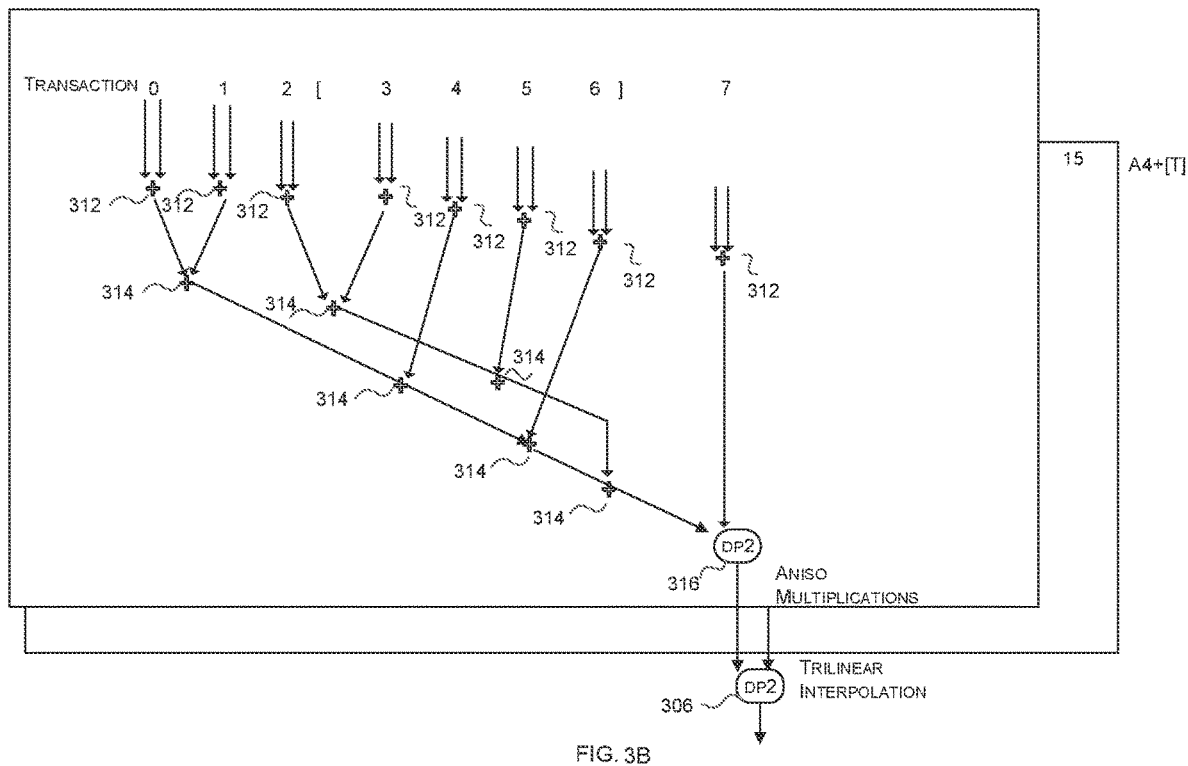

FIG. 3B shows a graphical representation of the operations performed when the texture filtering involves anisotropic-4+, where this refers to all anisotropic modes from 4 onwards (e.g. where vol_en=0 and ani_rt>1), and the square brackets around the input transactions in FIG. 3B indicate those that would not occur for anisotropic-4. In this example, all 16 input texture values (1*16*1=16) are summed in groups of two first by 8 successive operations using the second pipeline 219 that comprises an addition unit (blocks 312, i.e. 8 passes through the second pipeline 219). In the example shown in FIG. 3B, the groups (0-6) are then accumulated as: (((((0+1)+4)+6)+((2+3)+5)) using multiple operations using the second pipeline 219 (blocks 314, i.e. 6 further passes through the second pipeline 219) before the first pipeline 218 (comprising the DP2) is used for the anisotropic multiplications and final addition (block 316, i.e. a pass through the first pipeline 218, and may, for example, use a different anisotropic coefficient, hence the use of a DP2). If trilinear filtering is also used (e.g. where vol_en=0, tri_en=1 and ani_rt=15) then the DP2 may be used again for the trilinear interpolation (block 306, i.e. a second pass through the first pipeline 218) and the total number of input texture values used is 32 (1*16*2=32). It will be appreciated that the grouping of inputs shown in FIG. 3B is just one example and other examples may accumulate groups in a different way.

Figure 3C:
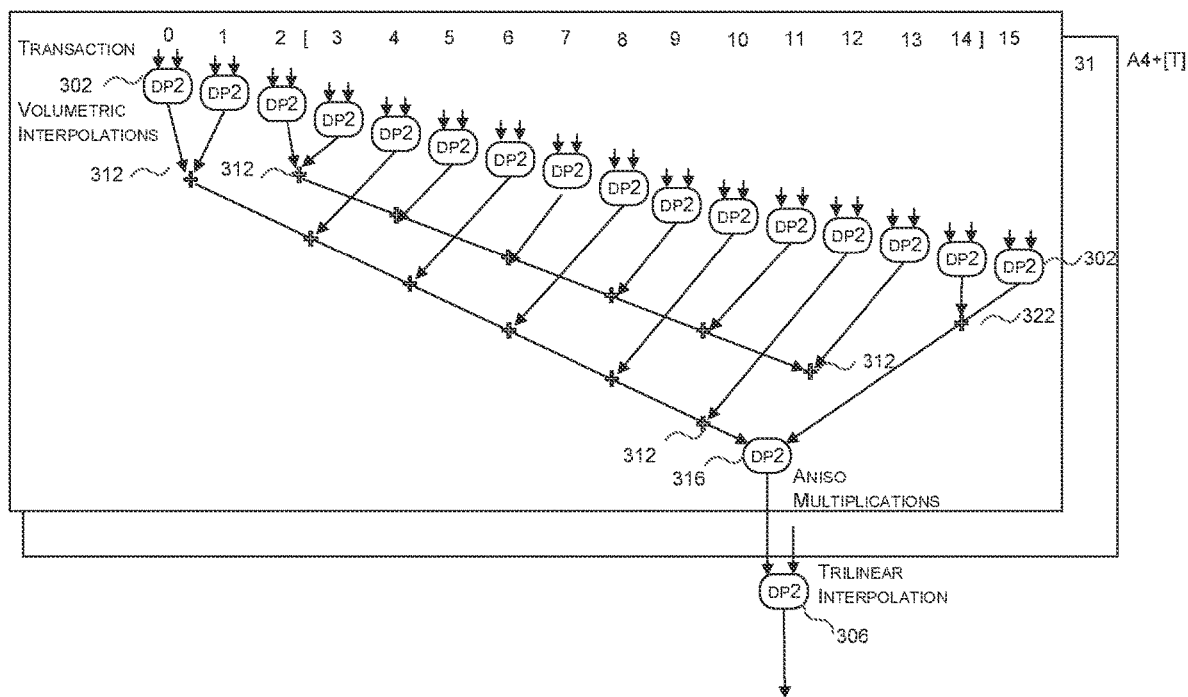

FIG. 3C shows a graphical representation of the operations performed when the texture filtering involves volumetric filtering and anisotropic-4+(e.g. where vol_en=1 and ani_rt=15 such that there are 2*16*1=32 inputs, although like in FIG. 3B the square brackets around the input transactions in FIG. 3C indicate those that would not occur for anisotropic-4). In this example, volumetric interpolations are performed first by a plurality successive operations using the first pipeline 218 that comprises a DP2 (blocks 302, i.e. 16 passes through the first pipeline 218), then the anisotropic inputs (0-13) are, in this example, accumulated as:

$$((((((0+1)+4)+6)+8)+10)+12)+$$

$$(((((2+3)+5)+7)+9)+11)+13))$$

by a plurality of successive operations using the second pipeline 219 that comprises an addition unit (blocks 312, i.e. 13 passes through the second pipeline 219). As described above, the order of the accumulation shown in FIG. 3C is shown by way of example only and other orders may alternatively be used. The aniso_last inputs (14-15) are summed together (block 322, i.e. a further pass through the second pipeline 219) and then the first pipeline 218 (comprising the DP2) is used for the anisotropic multiplications and final addition (block 316, i.e. a single pass through the first pipeline 218). If trilinear filtering is also used (e.g. where vol_en=1, tri_en=1 and ani_rt=15) then the DP2 may be used again for the trilinear interpolation (block 306, i.e. a further pass through the first pipeline 218) and the total number of input texture values used is 64 (216*2=64).

It can be seen that in the filtering operations represented in FIGS. 3A-3C there are no floating point accumulation operations. By architecting the operations in this way, the latency is reduced because it is not necessary to wait for a result to be available before more inputs can be processed.

The sequence in which inputs values and/or intermediate values are input to each of the pipelines (e.g. to implement the texture filtering operations shown in any of FIGS. 3A-3C) is controlled by the control block 208. As described above, each sequencer 212 operates in one of a set of pre-defined and hard-coded operating modes, where the selected mode defines the filtering operation that is applied to a stream of input texture values or on multiple interleaved streams of input texture values. Selection of a mode of operation by a sequencer is dependent upon the enable signals 203 (which may be referred to as control inputs or mode inputs). Each of the hard-coded operation modes is defined in a micro-program (or micro-code) 226 which is non-programmable and synthesised into hardware and comprises a state machine that runs on a stored function, a program counter 227, and in various programs (in some examples) a loop counter (e.g. where the same micro-program 226 is shared between multiple modes and the loops are not flattened so the program counter will be jumping backwards when looping). The micro-program defines a sequence of operations to be performed on a set of input data to generate the final output of the texture filtering operation. Any jumps in a micro-program are dependent only upon the control inputs and not upon the texture values themselves. In various examples, however, there may be a few limited exceptions to this, for example, there may be a number of pre-defined input texture values that halt the calculating sequence and trigger the output of the input texture value. In various examples, the mode input that controls jumps in a program may be one of the enable signals 203, ani_rt (i.e. the anisotropic ratio, as described above). Different micro-programs may therefore be provided to implement each of the filtering operations shown in FIGS. 3A-3C and in various examples each scheduler may be identical, i.e. it may comprise the same set of micro-programs, and in various examples there may be 5 or 7 micro-programs (and hence modes of operation) which each relate to a different combination of filtering methods.

The use of micro-programs, as described herein, reduces the complexity of the behaviour of the sequencers 212 (e.g. compared to attempting to optimise sequences for all interleaving modes and having transitions between modes handled smoothly) and hence reduces the size (e.g. in terms of area of hardware logic) of the sequencers. By enabling jumps within a micro-program based on control inputs, the number of micro-programs within each sequencer is reduced and hence the area of each sequencer is reduced. Whilst all the sequencers are described above as being identical, in other examples, the size of the sequencers may be further reduced by having different subsets of micro-programs within different sequencers.

In various examples, the micro-programs 226 are written so that all store instructions are pipelined inside the datapath 210 (e.g. such that the 'instruction packet' going into the datapath 210 contains a destination for the result of the calculation, such as a location in the scratchpad 220). This allows stalling of individual sequencers when a resource is not available without ever having to stall the datapath (unless something is stalled downstream of the texture filtering unit). In order to prevent hazards, the micro-programs do not initiate a store command to a scratchpad register before that register is read for the last time and the micro-programs explicitly contain the necessary delays. In addition, the micro-programs include the necessary delays when reading intermediate values to ensure that the intermediate value has been written to the scratchpad registers 220 before it is read. The micro-programs 226 may therefore be described as hazard-free.

As shown in FIG. 2, the control block 208 comprises a plurality of sequencers 212 (e.g. four sequencers) and the sequencers 212 have overlapping activity, i.e. more than one sequencer 212 may require the use of the same pipeline at the same time (e.g. two or more sequencers may require use of the first pipeline 218 or the second pipeline 219 at the same time). The sequencers 212 therefore indicate their status (e.g. in the form of requests for access to resources, where these resources include the pipelines 218-219 and may also include the output 224) to the arbiter 214. The arbiter 214 grants access to the resources (e.g. to the pipelines 218-219) according to a fixed priority scheme (i.e. based on pre-defined rules). In various examples, the arbiter 214 prioritises requests for resources that involve a new input texture value (e.g. input0 204 or input 1 206) and otherwise the arbiter 214 implements a fixed prioritization between sequencers 212 (e.g. a round robin arbitration scheme or other prioritization scheme). As shown in FIG. 2, the arbiter 214 controls access to the resources in the datapath by controlling a multiplexer 216 within the control block 208. The output from the multiplexer 216 comprises control signals that control the operation of the source multiplexer 223 in the datapath 210 and hence control what values are input to each of the pipelines 218-219 in any clock cycle. In some examples, multiple control signals are output from the multiplexer 216 to independently control the inputs to each of the pipelines 218-219.

As is shown in FIGS. 3A-3C, not all filtering operations use the same pipelines in the same order and hence if, for example, one sequencer is implementing a first filtering operation as shown in FIG. 3A on a first input stream of texture values, it only requests use of the first pipeline 218, whereas a second sequencer that is implementing the filtering operation shown in FIG. 3B, it primarily requests use of the second pipeline 218. At a point where both sequencers request use of the first pipeline 218, the arbiter 214 prioritizes the sequencer that is performing an operation involving a new input texture (e.g. operations 302 in FIG. 3A) and otherwise implements a fixed prioritization between the sequencers (e.g. as described above).

As shown in FIGS. 3A-3C, the final output result is always generated by a DP2 operation and hence, as shown in FIG. 2, the output from the first pipeline 218 is connected to the output 224 from the texture filtering unit 200 and the output from the second pipeline 219 is not, but is instead only connected to the multiplexer 222 that controls stores to the scratchpad registers 222. In other examples, however, where the texture filtering unit 200 performs texture filtering operations in which the final operation is an addition (as performed by the second pipeline 219), then the output from the second pipeline 219 is additionally (or instead) connected to the output 224 from the texture filtering unit 200.

In examples where the final output result is always generated by a DP2 operation (e.g. as in the example shown in FIGS. 3A-3C), the arbiter 214 can control the order in which results are output by controlling access to the first pipeline 218 for the final DP2 operation in any micro-program (e.g. block 304 or 306 in FIG. 3A, block 316 or 306 in FIGS. 3B and 3C) and in various examples an operation may be prevented from starting (by the arbiter 214) if the output is not ready. This means that additional storage (e.g. to hold more than one result) at the output 224 is not required. In other examples, however, storage may be provided prior to the output 224 and final results may be stored in that storage and output in an order controlled by the control block 208 or, as described above, outputs may be stored in the scratchpad 220 (or a temporary register) in the event that the output is not ready.

Although the first pipeline 218 in the texture filtering unit 200 in FIG. 2 is shown as comprising a DP2, in other examples it may comprise a single multiplier unit. By using a multiplier instead of a DP2, the size of the pipeline (e.g. the area of the hardware) is reduced; however, use of a DP2 (or separate multipliers and adders that implement the same functionality) ensures that simple interpolations are fully accurate.

FIG. 4 is a schematic diagram of a second example texture filtering unit 400 which may be implemented as the texture filtering unit 102 in the pipeline 100 of FIG. 1. This texture filtering unit 400 comprises all the elements shown in the first example texture filtering unit 200, described above, and in addition shows additional signal flows (e.g. signals that enable the sequencers to indicate that they want an input, that that input is the last, when they are idle, stall signals, etc.) and register stages (many of which may also be present in the first example texture filtering unit 200 but are omitted from FIG. 2 for reasons of clarity only) and further comprises a main controller unit 402. In this example, the main controller 402 indicates when any of the sequencers 212 can start processing a filtering sequence (i.e. start a new texture filtering operation by executing a micro-program) and which sequence the next input belongs to. Additionally the main controller unit 402 keeps track of the order in which sequencers are supposed to produce an output and hence ensures that outputs are generated from the texture filtering unit 400 in the right order.

In the examples shown in FIGS. 2 and 4, the datapath 210 comprises only a single DP2 and a single addition unit. In other examples, the datapath 210 may comprise a different combination of computational logic blocks. In many examples, the resources within the datapath (i.e. the computational logic blocks within the datapath) are limited, i.e. the total throughput of the computational logic blocks within the pipelines is lower than what the sequencers may request.

As described above, a sequencer may operate on an input stream of texture values or on interleaved streams of texture values. Where interleaving is used, the inputs that contribute to a single filtered output may not be received immediately following each other. The use of interleaved streams may be signalled to the texture filtering unit 102, 200, 400 using an additional enable (or control) signal 203:

| Enable signal | Possible values | Meaning |
| --- | --- | --- |
| interleaving | 0, 1 | Interleaving is disabled or enabled respectively |

The interleaving of input streams of texture values may be used where, for example, a plurality of texture values are accessed from memory at the same time (e.g. R and G values) but need to be filtered separately (e.g. where colour filtering is being performed separately for each colour). This improves efficiency since the texture values for the different streams (e.g. RGBA) may be stored contiguously and by using interleaving, it avoids having to deserialize the texture values (which is expensive for long sequences).

In the examples described above, the texture filtering units 200, 400 are arranged to implement any one or more of: volumetric, anisotropic and trilinear filtering. In further examples, the texture filtering unit may be arranged to implement any combination of volumetric, anisotropic, trilinear and bilinear filtering (e.g. by changing the micro-programs). In order to be able to implement bilinear filtering without significantly reducing final output rates, the number of inputs to the texture filtering unit configured to receive texture values (e.g. inputs 204, 206) may be increased and the number of computational pipelines in the datapath block may be increased (e.g. by the addition of a plurality of pipelines that, like the first pipeline 218, each comprise a DP2 and additional scratchpad register entries).

Figure 5:
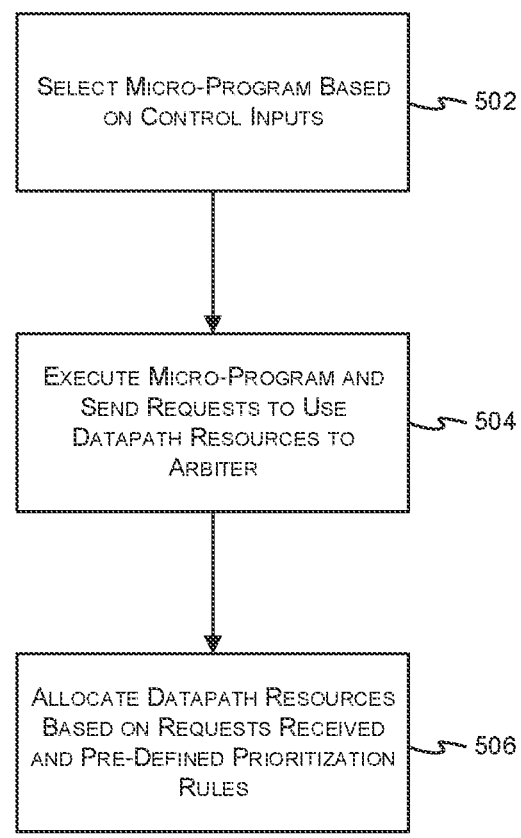
FIG. 5 is a flow diagram of an example method of operation of a control block within the texture filtering unit shown in FIG. 2 or 4.

FIG. 5 is a flow diagram of an example method of operation of the control block 208 within the texture filtering unit 200, 400 shown in FIG. 2 or 4. As described above, each sequencer 212 selects a micro-program 226 based on control inputs (block 502) e.g. based on the enable signals 203. The sequencers 212 then execute the selected micro-program and send requests to use datapath resources (e.g. the pipelines 218-219) to the arbiter 214 (block 504). The arbiter 214 allocates datapath resources to the sequencers 212 based on the requests received from the sequencers 212 and pre-defined prioritization rules (block 506). As described above, the arbiter 214 may prioritize those requests where new input texture values will be input to the pipeline (i.e. over those requests which relate to the processing of intermediate values only) and after that may apply a fixed prioritization scheme between sequencers. As also described above, the arbiter 214 may pre-allocate output slots (and hence, in various examples, the DP2 pipeline). Where provided, the main controller 402 also controls which sequencer is the next to start.

The hardware and methods described herein achieves high utilisation of the datapath resources (e.g. the pipelines and the computational logic blocks within them) under most circumstances. This compares to known systems where there is often unused logic, reduced performance and/or a more complex and less maintainable sequencing scheme. The hardware and methods described herein are self-organising and result in utilisation patterns that are difficult to predict precisely. The current complication of optimising a system for both serial and interleaved sequences is avoided and it is possible to guarantee that the micro-programs are hazard-free without any significant performance degradation because after inputs are processed, the programs become less dense and will not be blocking other sequencers from processing inputs.

The techniques described above in the context of texture filtering within a GPU may also be used for other applications that involve floating-point operations comprising evaluation of a plurality of sum-of-products (SOPs) followed by an accumulation stage. In such examples, the texture filtering unit described above may instead be referred to as a computation unit and the filter coefficients may instead be replaced by SOP coefficients. Examples of other applications include coordinate transformations, depth calculations and some common shader calculations.

A further example describes a graphics processing unit comprising a computation unit implemented in hardware logic, the computation unit comprising: a plurality of inputs arranged to receive one or more input values each clock cycle and a plurality of SOP coefficients, the plurality of SOP coefficients comprising coefficients relating to a plurality of different SOPs (e.g. to perform operations such as transformations or shading); a datapath block comprising a plurality of parallel computation pipelines, each containing at least one hardware logic component configured to receive a plurality of inputs and generate an output value as part of a SOP computation; and a control block comprising a plurality of sequencers and an arbiter, wherein each sequencer comprises a plurality of hard-coded micro-programs and hardware logic arranged to select one of the micro-programs based on one or more control inputs, wherein each micro-program defines a sequence of operations to be performed by the pipelines in the datapath block as part of a SOP computation and different micro-programs implement different SOPs, and wherein the arbiter comprises hardware logic arranged to control access to the computation pipelines by the sequencers according to pre-defined prioritization rules.

Figure 6:
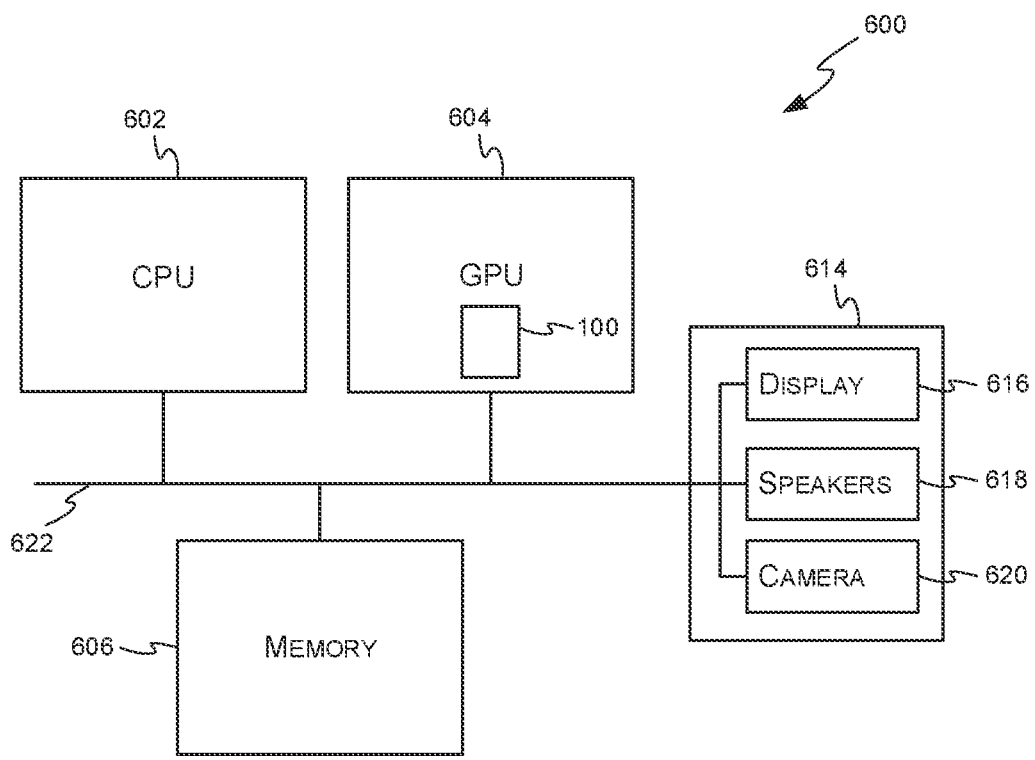
FIG. 6 shows a computer system in which a texture filtering unit as described herein is implemented.

FIG. 6 shows a computer system in which the graphics processing systems described herein may be implemented. The computer system comprises a CPU 602, a GPU 604, a memory 606 and other devices 614, such as a display 616, speakers 618 and a camera 620. A GPU pipeline 100 comprising a texture filtering unit as described above is implemented within the GPU 604. The components of the computer system can communicate with each other via a communications bus 622.

FIGS. 1-5 are shown as comprising a number of functional blocks. This is schematic only and is not intended to define a strict division between different logic elements of such entities. Each functional block may be provided in any suitable manner. It is to be understood that intermediate values described herein as being formed by the texture filtering unit (or more the coefficient merging logic block within the texture filtering unit) need not be physically generated by the hardware logic at any point and may merely represent logical values which conveniently describe the processing performed by the texture filtering unit between its input and output.

The texture filtering unit described herein may be embodied in hardware on an integrated circuit. The texture filtering unit described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a texture filtering unit configured to perform any of the methods described herein, or to manufacture a texture filtering unit comprising any apparatus described herein. An integrated circuit definition dataset may be, for example, an integrated circuit description.

Therefore, there may be provided a method of manufacturing, at an integrated circuit manufacturing system, a texture filtering unit as described herein. Furthermore, there may be provided an integrated circuit definition dataset that, when processed in an integrated circuit manufacturing system, causes the method of manufacturing a texture filtering unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a texture filtering unit will now be described with respect to FIG. 7.

Figure 7:
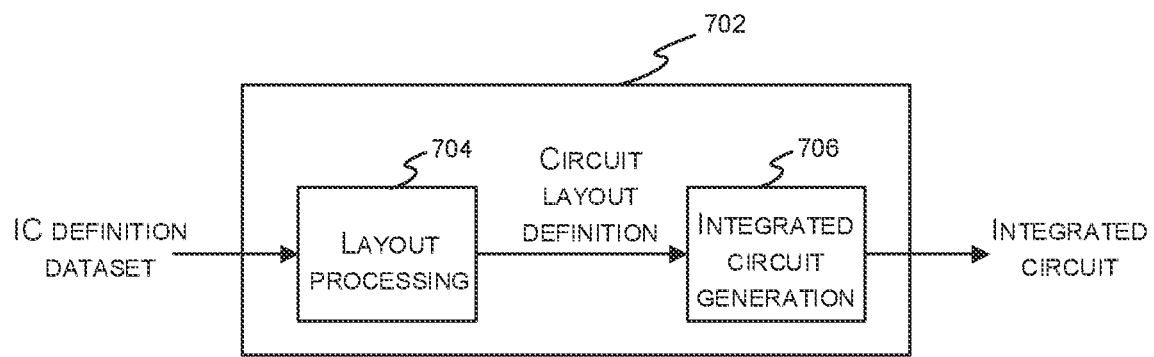
FIG. 7 shows an integrated circuit manufacturing system for generating an integrated circuit embodying a texture filtering unit as described herein.

FIG. 7 shows an example of an integrated circuit (IC) manufacturing system 702 which is configured to manufacture a texture filtering unit (or a GPU comprising a texture filtering unit, as described herein) as described in any of the examples herein. In particular, the IC manufacturing system 702 comprises a layout processing system 704 and an integrated circuit generation system 706. The IC manufacturing system 702 is configured to receive an IC definition dataset (e.g. defining a texture filtering unit as described in any of the examples herein), process the IC definition dataset, and generate an IC according to the IC definition dataset (e.g. which embodies a texture filtering unit as described in any of the examples herein). The processing of the IC definition dataset configures the IC manufacturing system 702 to manufacture an integrated circuit embodying a texture filtering unit as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 702 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a texture filtering unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing unit comprising a computation unit implemented in hardware logic, the computation unit comprising:
    a plurality of inputs arranged to receive one or more input values and a plurality of sum-of-products (SOP) coefficients, the plurality of SOP coefficients comprising coefficients relating to a plurality of different SOPs;
    a datapath block comprising one or more computation pipelines; and
    a control block comprising a plurality of sequencers;
    wherein each sequencer comprises a plurality of hard-coded micro-programs and hardware logic arranged to select one of the micro-programs based on one or more control inputs, wherein each micro-program defines a sequence of operations to be performed by the pipelines in the datapath block as part of a SOP computation and different micro-programs implement different SOPs.

2. The graphics processing unit according to claim 1, wherein each operation in the sequence of operations defined by a micro-program apart from a final operation in the sequence generates an intermediate value and the final operation in the sequence generates an output value and wherein the datapath block further comprises scratchpad registers, wherein the scratchpad registers are arranged to store the intermediate values generated by one of the computation pipelines when performing operations in a micro-program.

3. The graphics processing unit according to claim 2, wherein the scratchpad registers comprise a set of scratchpad registers for each sequencer in the control block, wherein the set of scratchpad registers for a sequencer are arranged to store the intermediate values generated by one of the computation pipelines when performing one of the operations in the sequence defined by the selected micro-program.

4. The graphics processing unit according to claim 2, wherein the scratchpad registers are further arranged to store an output value and wherein one of the computation pipelines comprises a bypass path that bypasses the hardware logic component within it.

5. The graphics processing unit according to claim 2, wherein the control block outputs, for each intermediate value generated by one of the computation pipelines, a destination for the intermediate result.

6. The graphics processing unit according to claim 5, wherein the destination for an intermediate result is a location in the scratchpad registers.

7. The graphics processing unit according to claim 1, wherein each sequencer is arranged, when executing a selected micro-program, to send a sequence of requests for access to one of the pipelines in the datapath block to an arbiter, each request corresponding to an operation in the sequence defined by the selected micro-program, and wherein hardware logic in the arbiter is arranged to control access to the computation pipelines by applying prioritization rules to the requests received from the sequencers.

8. The graphics processing unit according to claim 7, wherein the prioritization rules prioritize access for operations involving a new input value.

9. The graphics processing unit according to claim 1, wherein the control block further comprises a main controller unit arranged to indicate when sequencers can start executing a micro-program and to control an order in which outputs are output, via an output, from the computation unit.

10. The graphics processing unit according to claim 1, wherein any state transitions in a micro-program are controlled based on the control inputs and not on the input values.

11. The graphics processing unit according to claim 1, wherein the datapath block comprises a plurality of parallel computation pipelines.

12. The graphics processing unit according to claim 1, wherein all of the sequencers in the control block are identical.

13. The graphics processing unit according to claim 1, wherein the input values comprise a plurality of interleaved input values from different streams accessed from memory at the same time.

14. A method of evaluating a plurality of sum-of-products (SOPs) within a graphics processing unit (GPU), the GPU comprising a computation unit and the computation unit comprising a datapath block comprising one or more computation pipelines and a control block comprising a plurality of sequencers, the method comprising:
receiving, by the computation unit, one or more input values and a plurality of SOP coefficients, the plurality of SOP coefficients comprising coefficients relating to a plurality of different SOPs;
selecting, in each sequencer, a micro-program based on one or more control inputs, wherein the micro-program defines a sequence of operations to be performed by the pipelines in the datapath block as part of a SOP computation and different micro-programs implement different SOPs; and
executing, in each sequencer, the selected micro-program.

15. The method according to claim 14, further comprising when executing, in each sequencer, the selected micro-program: sending a sequence of requests for access to one of the pipelines in the datapath block, each request corresponding to an operation in the sequence defined by the selected micro-program.

16. The method according to claim 15, further comprising:
generating, in a pipeline, an output value as part of a SOP computation.

17. The method according to claim 16, wherein generating an output value as part of a SOP computation comprises:
generating, from each operation in the sequence of operations defined by a micro-program apart from a final operation in the sequence, an intermediate value;
generating, from the final operation in the sequence, an output value; and
storing, in scratchpad registers in the datapath block, the intermediate values.

18. The method according to claim 15, further comprising:
sending, by a sequencer when executing a selected micro-program, a sequence of requests for access to one of the pipelines in the datapath block, each request corresponding to an operation in the sequence defined by the selected micro-program; and
controlling access to the computation pipelines by applying prioritization rules to the requests received from the sequencers.

19. The method according to claim 15, further comprising:
indicating, by a main controller unit in the control block when sequencers can start executing a micro-program; and
controlling an order in which outputs are output from the computation unit.

20. A non-transitory computer readable storage medium having stored thereon an integrated circuit definition dataset that, when processed in an integrated circuit manufacturing system, configures the integrated circuit manufacturing system to manufacture a graphics processing unit, the graphics processing unit comprising a computation unit implemented in hardware logic, the computation unit comprising:
a plurality of inputs arranged to receive one or more input values and a plurality of sum-of-products (SOP) coefficients, the plurality of SOP coefficients comprising coefficients relating to a plurality of different SOPs;
a datapath block comprising one or more computation pipelines; and
a control block comprising a plurality of sequencers, wherein each sequencer comprises a plurality of hard-coded micro-programs and hardware logic arranged to select one of the micro-programs based on one or more control inputs, wherein each micro-program defines a sequence of operations to be performed by the pipelines in the datapath block as part of a SOP computation and different micro-programs implement different SOPs.

* * * * *